United States Patent
Lin

(10) Patent No.: US 6,752,070 B1
(45) Date of Patent: Jun. 22, 2004

(54) FILTER ASSEMBLY OF COFFEE MAKER

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 0 days.

(21) Appl. No.: 10/662,922

(22) Filed: Sep. 15, 2003

(51) Int. Cl.[7] .......................... A47J 31/02; A47J 31/10; A47J 31/14; A47J 31/24; A23L 1/00
(52) U.S. Cl. .......................... 99/295; 99/299; 99/302 R
(58) Field of Search .......................... 99/495, 452, 285, 99/295, 297, 299, 304–306, 317, 319, 279, 318, 323, 316, 323.1, 323.3, 300, 302 R, 332.2; 210/474, 479, 232, 481, 477, 482; 426/432, 433, 429

(56) References Cited

U.S. PATENT DOCUMENTS

| | | | | |
|---|---|---|---|---|
| 4,343,232 A | * | 8/1982 | Corbier | 99/299 |
| 4,497,243 A | * | 2/1985 | Cavalli | 99/495 |
| 4,656,932 A | * | 4/1987 | Kopp | 99/295 |
| 4,697,502 A | * | 10/1987 | English et al. | 99/299 |
| 5,064,533 A | * | 11/1991 | Anson | 210/232 |
| 5,628,902 A | * | 5/1997 | Pytlik et al. | 210/474 |
| 5,642,656 A | * | 7/1997 | Braendle | 99/295 |
| 5,687,637 A | * | 11/1997 | Brookshire et al. | 99/295 |
| 6,044,754 A | * | 4/2000 | Fuentes | 99/295 |
| 6,279,460 B1 | * | 8/2001 | Pope | 99/299 |
| 6,343,542 B1 | * | 2/2002 | Shen | 99/299 |
| 6,494,128 B1 | * | 12/2002 | Yu | 99/495 |
| 6,655,260 B2 | * | 12/2003 | Lazaris et al. | 99/295 |

* cited by examiner

Primary Examiner—Timothy F. Simone
(74) Attorney, Agent, or Firm—Alan D. Kamrath; Nikolai & Mersereau, P.A.

(57) ABSTRACT

A filter assembly of coffee maker is provided. The assembly comprises an open container comprising a central well, two hollow legs, two grooves in communication between the well and the legs, and an interior, annular shoulder; a disc-shaped seat having its edge rested on the shoulder and including a central opening and an intermediate, annular raised section; a disc-shaped silicone rubber member including an annular flange at the underside with the edge of the central opening fastened therein, a central hole, and a raised edge fitted on the raised section; and a filter cup having bottom and top rested on the silicone rubber member and the container respectively. Coffee made in the filter cup may flow into the well through meshed openings of the filter cup and the central hole prior to flowing out of the container through the grooves and the legs once the well is full of coffee.

1 Claim, 4 Drawing Sheets

FILTER ASSEMBLY OF COFFEE MAKER

BACKGROUND OF THE INVENTION

1. Field of the Invention

The present invention relates to coffee makers and more particularly to a filter assembly of coffee maker with improved characteristics.

2. Description of Related Art

A conventional coffee maker 1 having a filter assembly 10 is shown in FIGS. 1 and 2. The filter assembly 10 comprises an open container 20 comprising a handle 201, an interior space 202, and two hollow legs 203 at the underside, a seat 30 in the space 202 and including two hollow pegs 301 fitted in the legs 203, a central well 302, and two side grooves 303 in communication between the well 302 and the pegs 301, a disc-shaped silicone rubber member 40 including a central hole 401, the silicone rubber member 40 being secured onto the seat 30 by wrapping its edge around an annular flange of the seat 30, and a filter cup 50 including a plurality of meshed openings 501 on the bottom and an annular flange 502 in which the bottom of the filter cup 50 is rested on the silicone rubber member 40 and the flange 502 is rested on top of the container 20. Hot water can be poured from a hot water reservoir 11 into the filter cup 50 to mix with coffee powder therein. The made coffee then flows into the well 302 through the meshed openings 501 and the central hole 401. Next, the coffee overflows into two cups (not shown) under the legs 203 through the grooves 303 and the peg 301 once the well 302 is full of coffee.

But this is unsatisfactory for the purpose for which the invention is concerned for the following reasons: The fastening of the silicone rubber member 40 and the seat 30 by wrapping around edges or the disassembly of them is a difficult, inconvenient process. Further, the capacity of the well 302 is small, resulting in a slow flow of coffee into the cups. Thus, the need for improvement still exists.

SUMMARY OF THE INVENTION

It is an object of the present invention to provide a filter assembly mounted in a coffee maker, comprising an open container comprising a handle, a central well, two side grooves in communication with the well, two hollow legs at the underside, the legs being in communication with the grooves, and an interior, annular shoulder; a disc-shaped seat having its edge rested on the shoulder and including a central opening and an intermediate, annular raised section; a disc-shaped silicone rubber member including an annular flange at the underside with the edge of the central opening fastened by the flange, a central hole, and a raised edge fitted on the raised section; and a filter cup rested on the silicone rubber member and including a plurality of meshed openings on the bottom and a top annular flange rested on the container, wherein coffee made in the filter cup is adapted to flow into the well through the meshed openings and the central hole prior to flowing out of the container through the grooves and the legs once the well is full of coffee.

The above and other objects, features and advantages of the present invention will become apparent from the following detailed description taken with the accompanying drawings.

DETAILED DESCRIPTION OF THE PREFERRED EMBODIMENTS

Figure 1:
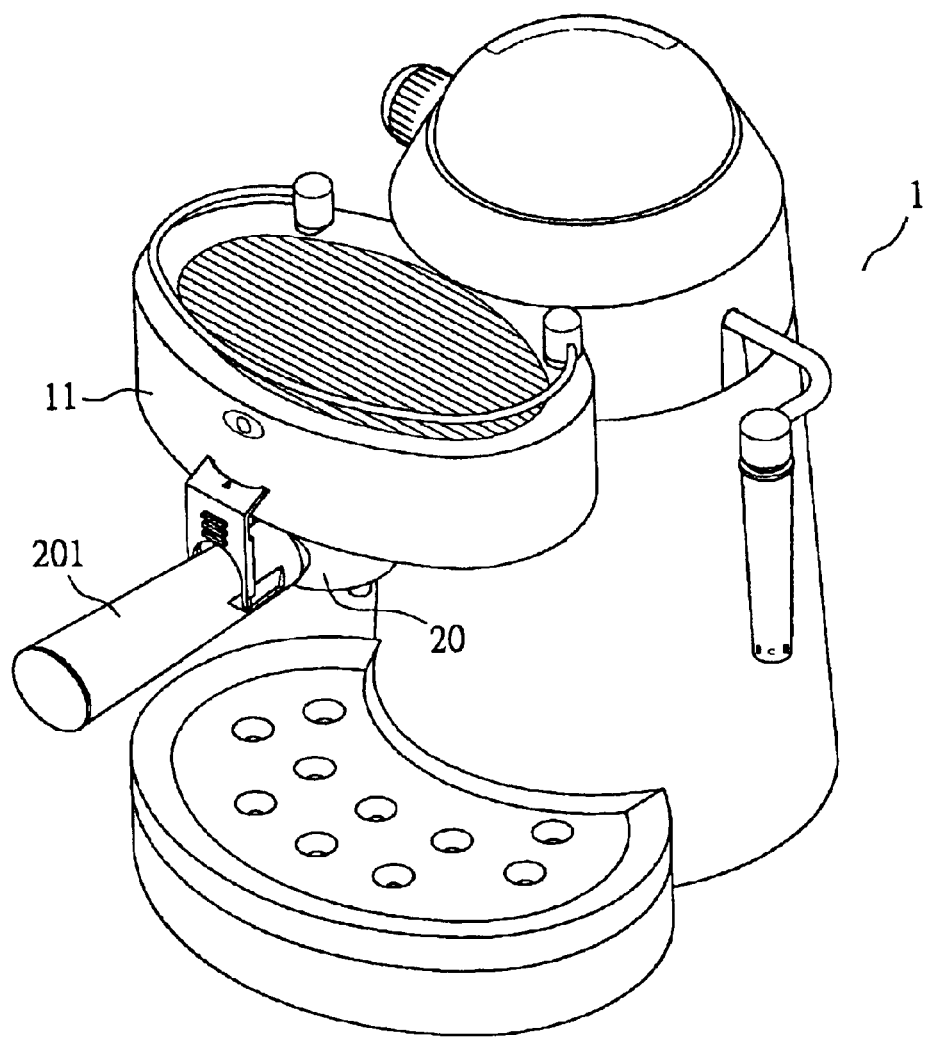
FIG. 1 is a perspective view of a coffee maker having a conventional filter assembly.
Figure 2:
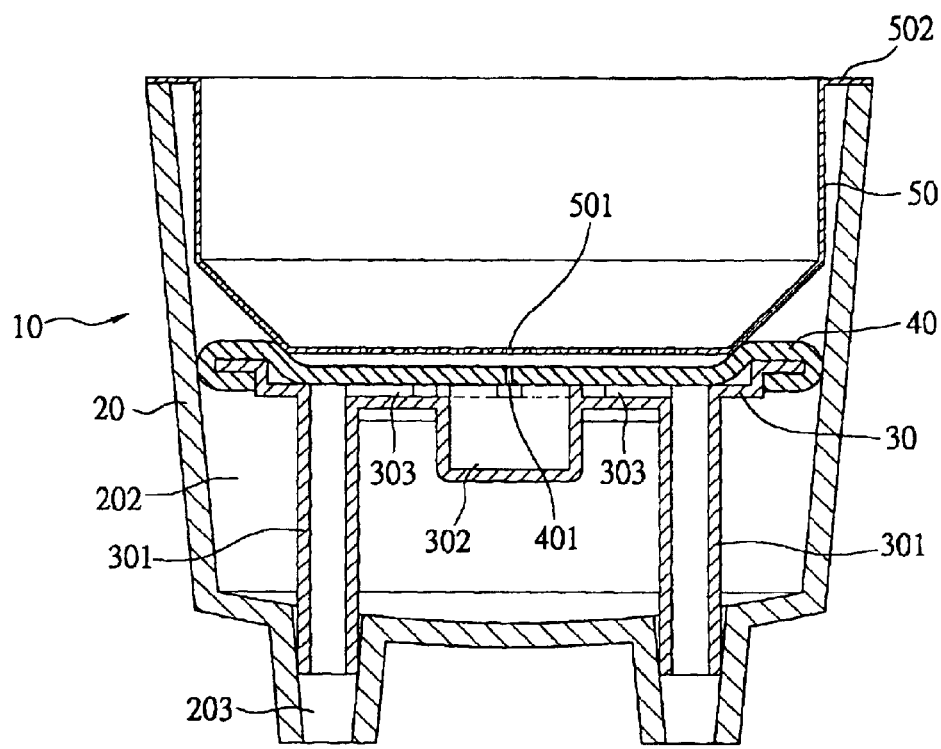
FIG. 2 is a cross-sectional view of the filter assembly shown in FIG. 1.
Figure 3:
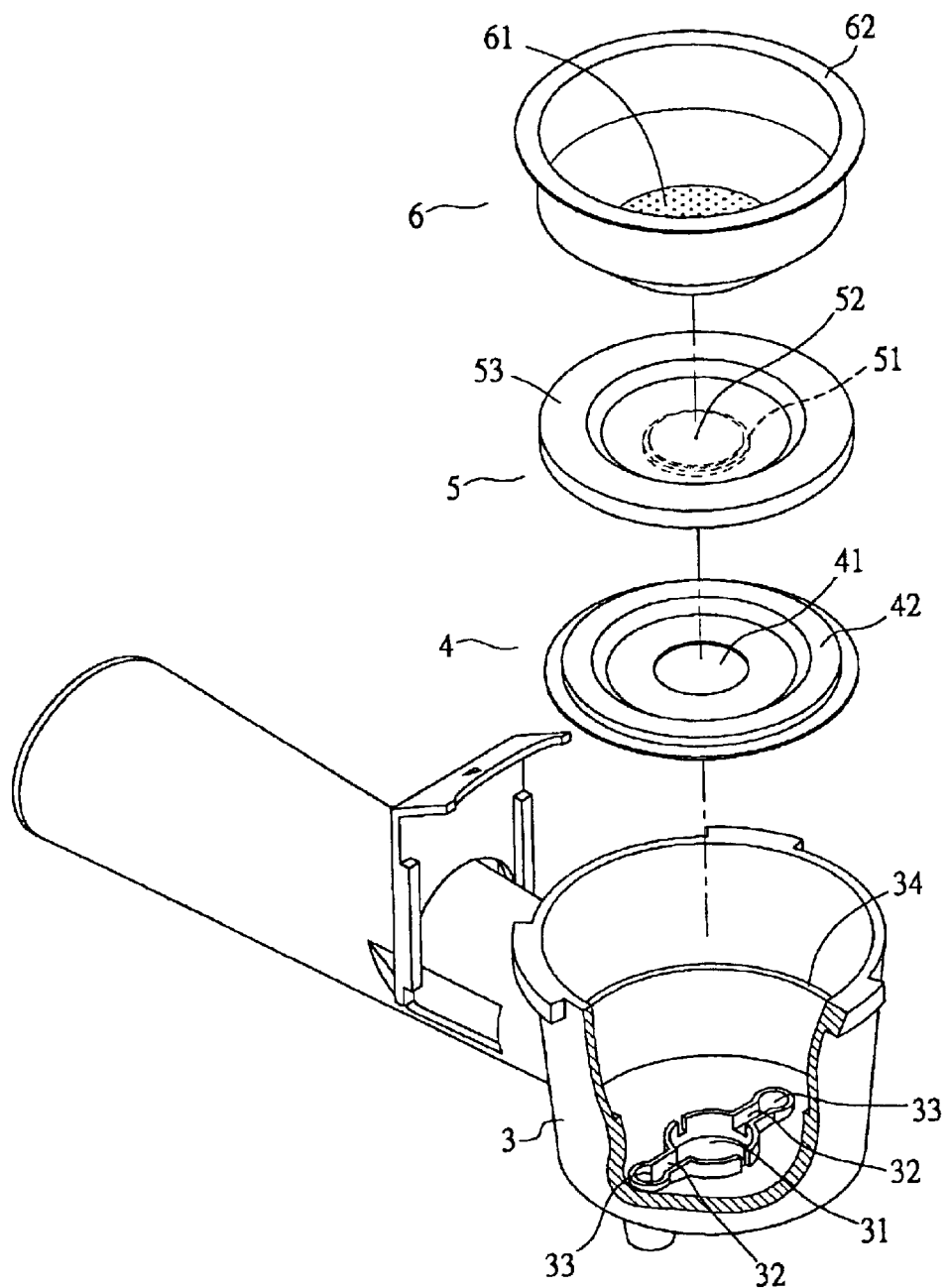
FIG. 3 is an exploded view with a portion cut away of a filter assembly mounted in a coffee maker according to the invention.
Figure 4:
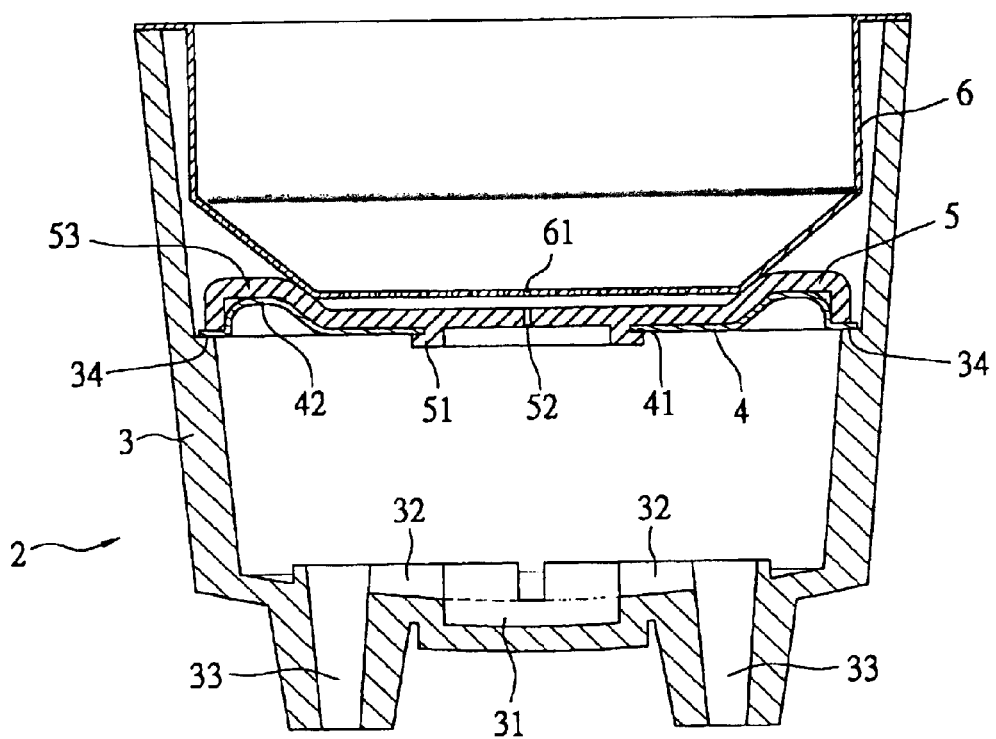
FIG. 4 is a cross-sectional view of the filter assembly shown in FIG. 3.

Referring to FIGS. 3 and 4, there is shown a filter assembly 2 mounted in a coffee maker in accordance with the invention. The filter assembly 2 comprises an open container 3 comprising a handle, an interior space, a central well 31, two side grooves 32 in communication with the well 31, two hollow legs 33 at the underside, the legs 33 being in communication with the grooves 32, and an interior, annular shoulder 34; a disc-shaped seat 4 having its edge rested on the shoulder 34 and including a central opening 41 and an intermediate, annular raised section 42; a disc-shaped silicone rubber member 5 including an annular flange 51 at the underside with the edge of the central opening 41 fastened by the flange 51, a central hole 52, and a raised edge 53 fitted on the raised section 42; and a filter cup 6 rested on the silicone rubber member 5 and including a plurality of meshed openings 61 on the bottom and a top annular flange rested on top of the container 3. Hot water can be poured from a hot water reservoir (see FIG. 1) into the filter cup 6 to mix with coffee powder therein. The made coffee then flows into the well 31 through the meshed openings 61 and the central hole 52. Next, the coffee overflows into two cups (not shown) under the legs 33 through the grooves 32 once the well 31 is full of coffee.

It will be evident from the foregoing that the invention has the following advantages: The fastening of the silicone rubber member 5 and the seat 4 by snapping is reliable. Further, the fastening or the disassembly of them is an easy process. Furthermore, the capacity of the container 3 is relative large, resulting in a quick flow of coffee into the cups.

While the invention herein disclosed has been described by means of specific embodiments, numerous modifications and variations could be made thereto by those skilled in the art without departing from the scope and spirit of the invention set forth in the claims.

What is claimed is:

1. A filter assembly mounted in a coffee maker, comprising:

an open container comprising a handle, a central well, two side grooves in communication with the well, two hollow legs at the underside, the legs being in communication with the grooves, and an interior, annular shoulder;

a disc-shaped seat having its edge rested on the shoulder and including a central opening and an intermediate, annular raised section;

a disc-shaped silicone rubber member including an annular flange at the underside with the edge of the central opening fastened therein, a central hole, and a raised edge fitted on the raised section; and a filter cup rested on the silicone rubber member and including a plurality of meshed openings on the bottom and a top annular flange rested on the container, wherein coffee made in the filter cup is adapted to flow into the well through the meshed openings and the central hole prior to flowing out of the container through the grooves and the legs once the well is full of coffee.

* * * * *